United States Patent
Duval et al.

(10) Patent No.: US 12,193,456 B2
(45) Date of Patent: Jan. 14, 2025

(54) EARLY LIFE NUTRITION

(71) Applicant: DSM IP ASSETS B.V., Heerlen (NL)

(72) Inventors: Stephane Duval, Kaiseraugst (CH);
Maik Kindermann, Kaiseraugst (CH);
Sarah Jade Meale, Gatton (AU); Diego Pablo Morgavi,
Saint-Genès-Champanelle (FR)

(73) Assignee: DSM IP ASSETS B.V., Heerlen (NL)

( * ) Notice: Subject to any disclaimer, the term of this patent is extended or adjusted under 35 U.S.C. 154(b) by 581 days.

(21) Appl. No.: 17/603,195

(22) PCT Filed: Apr. 14, 2020

(86) PCT No.: PCT/EP2020/060464
§ 371 (c)(1),
(2) Date: Oct. 12, 2021

(87) PCT Pub. No.: WO2020/212348
PCT Pub. Date: Oct. 22, 2020

(65) Prior Publication Data
US 2022/0192229 A1    Jun. 23, 2022

(30) Foreign Application Priority Data
Apr. 16, 2019  (EP) .................................. 19169626

(51) Int. Cl.
*A61K 31/045*   (2006.01)
*A23K 20/105*   (2016.01)
*A23K 50/10*    (2016.01)

(52) U.S. Cl.
CPC ............ *A23K 20/105* (2016.05); *A23K 50/10* (2016.05)

(58) Field of Classification Search
CPC ..................................................... A61K 3/045
See application file for complete search history.

(56) References Cited

FOREIGN PATENT DOCUMENTS

| WO | WO-2012084629 A1 | * | 6/2012 | ............. A23K 20/10 |
| WO | 2019/056051 | | 3/2019 | |

OTHER PUBLICATIONS

Leticia Abecia, et al., "An Antimethanogenic Nutritional Intervention in Early Life of Ruminants Modifies Ruminal Colonization by Archaea", Archaea, vol. 2014, Jan. 1, 2014, 13 pages.
Pablo S. Alvarez-Hess, et al., "A partial life cycle assessment of the greenhouse gas mitigation potential of feeding 3-nitrooxypropanol and nitrate to cattle", Agricultural Systems, vol. 169, Dec. 3, 2018, pp. 14-23 (10 pages).
International Search Report for PCT/EP2020/060464 dated Aug. 17, 2020, 4 pages.
Written Opinion of the ISA for PCT/EP2020/060464 dated Aug. 17, 2020, 8 pages.

* cited by examiner

*Primary Examiner* — Rosanne Kosson
(74) *Attorney, Agent, or Firm* — NIXON & VANDERHYE P.C.

(57) ABSTRACT

The present invention relates to a method of reducing methane emissions in ruminants, said method encompassing treating pre-/young ruminants with 3-nitrooxypropanol.

8 Claims, 1 Drawing Sheet

EARLY LIFE NUTRITION

Figure 1:
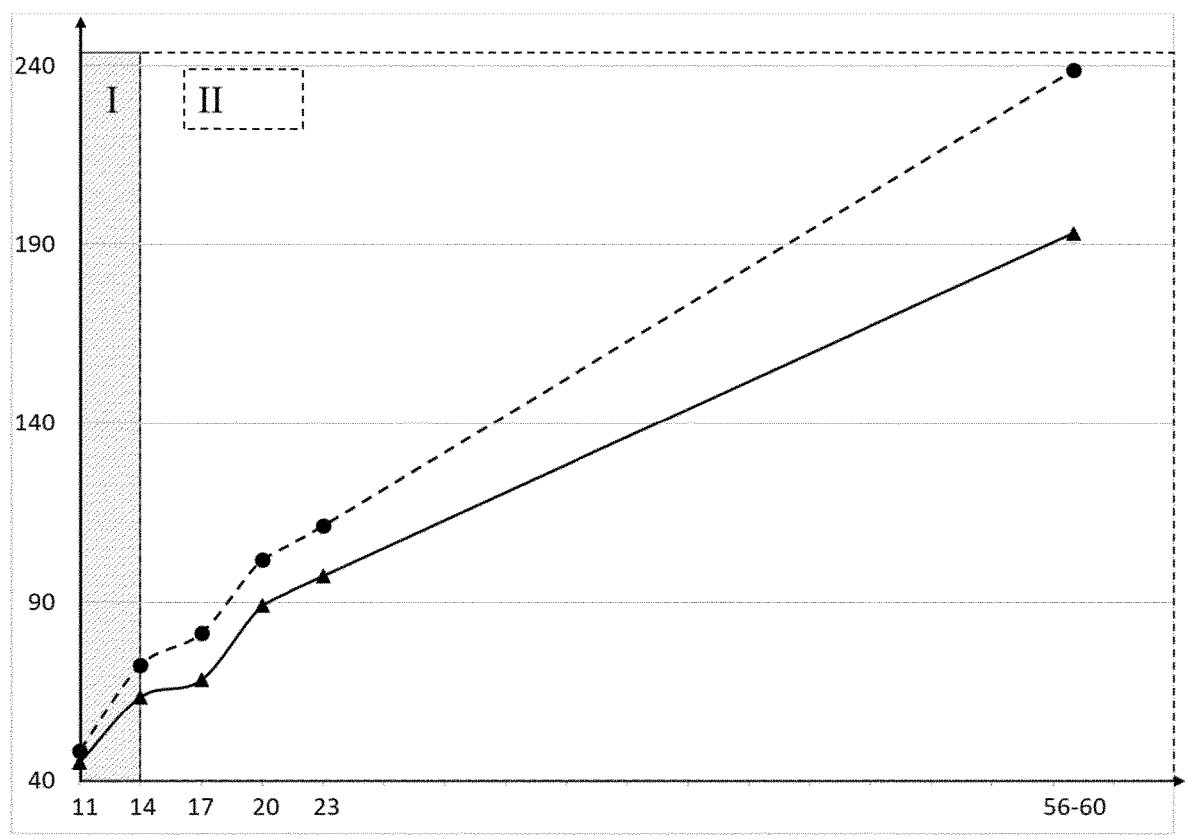

This application is the U.S. national phase of International Application No. PCT/EP2020/060464 filed Apr. 14, 2020 which designated the U.S. and claims priority to EP patent application Ser. No. 19/169,626.9 filed Apr. 16, 2019, the entire contents of each of which are hereby incorporated by reference.

BRIEF DESCRIPTION OF THE INVENTION

The present invention relates to a method of reducing methane emissions in ruminants, said method encompassing treating pre-/young ruminants with 3-nitrooxypropanol.

BACKGROUND OF THE INVENTION

Livestock production has been estimated to be responsible for approximately 14% of anthropogenic methane production released annually into the atmosphere, with the majority formed in ruminants as a result of the activity of ruminal methanogens (archaea) within the rumen of the host animal during enteric fermentation leading to the formation of methane which is eructated from the animal. Not only is methane a potent Greenhouse Gas (GHG) and a problem for the environment, it also represents a loss of energy from the host, with estimated losses ranging between 2 to 12% of gross energy dietary intake.

There are currently significant efforts in the agricultural sector to find ways of reducing the emission of methane from ruminants. One method includes the administration of anti-methanogenic feed additives such as chloroform, 3-nitrooxypropanol (3-NOP), linseed oil, inorganic nitrate, garlic extracts/oils and/or certain sea weed to adult ruminants. Another approach is to select for cows that are genetically pre-disposed to emitting less methane than others in the hope that their offspring also exhibits reduced methane emission or to alter the microbiome early in life, i.e. in the so-called pre-ruminant stage, in the hope of long-term persistent lower methane emission in such early life treated ruminants compared to non-treated ruminants.

Anti-methanogenic feed additives, even though shown to have a consistent and significant effect on reducing methane emissions in ruminants, generally need to be supplemented on a daily basis and in significant amounts to maintain that effect. Certain ruminants, e.g. grazing cattle are thus difficult to be targeted and currently out of reach for such treatment. Furthermore, the additive might have an unwanted impact on milk and/or meat: garlic derived products, for example, are known to confer an unpleasant taste to milk.

Previous experiments have demonstrated that an alteration of the microbiome in the pre-ruminant stage is possible in terms of the bacterial community structure with effects persisting even after the challenge or pressure has stopped (Yanez-Ruis et al. in FEMS Microbiol Ecol 72 (2010) 272-278 and in Front. Microbiol. 6:1133 (2015)). However, with respect to the methanogen community, which belong to the domain of archaea, several attempts, also using anti-methanogenic compounds, have failed to establish a persistent effect once the selection pressure has been removed even though during treatment supplementation a reduction in methane emission was achieved as e.g. illustrated by Saro et al. (Front. Microbiol. 9:1273 (2018)). The authors concluded that although there was a degree of plasticity within the rumen bacterial community that allowed an alteration of the development of the bacterial community, with respect to the methanogenic community, these organisms resisted change, and there was no persistency of the early-life disturbance on methanogenesis indicating resilience for this function. The authors even demonstrated that early-life treated lambs with an anti-methanogenic feed additive displayed a long-term increase in methane emissions compared to non-treated lambs.

Thus, there is an ongoing need for solutions to persistently reduce methane emissions in ruminants.

DETAILED DESCRIPTION OF THE INVENTION

It has been found, in accordance with this invention that by supplementing calves with 3-nitrooxypropanol immediately after birth until three weeks after weaning (14 weeks of age) persistent reduction in methane emissions from supplemented animals could be achieved, even long after the supplementation of 3-nitrooxypropanol had stopped. The treated animals exhibited lower methane emissions even after 60 weeks of age indicating the effect had persisted well into later life. Interestingly the overall number of methanogens was not reduced. Furthermore, no detrimental effects on host animal performance were observed.

Therefore, in a first embodiment, the present invention relates to a method for reducing methane emission in adult ruminants, said method encompassing administering to said ruminant in the pre-ruminant phase an effective amount of 3-nitrooxypropanol, and optionally appreciating the methane reducing effect, preferably in the longer term. Optionally, the administration is extended into the young ruminant phase.

Even more preferably, the 3-nitrooxypropanol is administered to the ruminant from birth up to an age of a maximum of 6 months, preferably up to an age of a maximum of 5 months, most preferably up to an age of a maximum of 4.

The invention furthermore relates to a method of reducing methane emission in adult ruminants comprising administering to a healthy new born ruminant desired to have a reduced methane emission as an adult ruminant an effective amount of 3-nitrooxypropanol.

A further aspect of this invention is the reduction of methane emanating from the digestive activities of a healthy ruminant through the use of orally administered 3-nitrooxypropanol in the pre-ruminant phase of said ruminant, optionally extended into the young ruminant phase.

Another aspect of this invention is the (non-therapeutic) use of 3-nitrooxypropanol in pre-ruminants to mitigate climate change (i.e. to help to reduce the planet's atmosphere warming) by reducing the total life-time methane emission of said ruminants (compared to a respective non-treated ruminant).

The invention also relates to a feeding regime for reducing methane emissions in adult ruminants and/or for reducing the total life-time methane emission of a ruminant (compared to a respective non-treated ruminant), comprising
(1) administering a diet comprising 3-nitrooxypropanol to said ruminant in its pre-ruminant and optionally young ruminant phase followed by
(2) administering a diet which does not contain 3-nitrooxypropanol to the adult ruminant.

The invention also encompasses a kit for decreasing methane emission in ruminants comprising
a.) at least one, preferably oral, dosage form of 3-nitrooxypropanol; and
b.) information which informs a prospective user about the benefits of administering 3-nitrooxypropanol to the ruminant in the pre-ruminant and optionally young ruminant phase in order to decrease the methane emission in the adult ruminant.

In another embodiment, the present invention relates to a low methane emitting ruminant, characterized in that said ruminant is obtained by supplementing said ruminant in the pre-ruminant phase with 3-nitrooxypropanol. Said ruminant is in particular characterized by the fact that the total life-time methane emission of said ruminant is lower compared to a respective non-treated ruminant.

In an additional embodiment, the present invention relates to a method of influencing the microbial colonialization pattern of the rumen of a ruminant, said method comprising the step of administering an effective amount of 3-nitrooxypropanol to said ruminant in the pre-ruminant phase.

Definitions

The so-called 'pre-ruminant phase' is the time in life of a ruminant when the digestive functions are more akin to those of monogastric animals. The pre-ruminant phase generally occurs during the first weeks of life when the calf is mostly ingesting milk or milk-replacer. Depending on the type of food offered and the intended use of the animals the pre-ruminant phase may be shorter or longer. During the second stage, the so-called 'young ruminant phase' or 'post-weaning phase', the rumen is developing but is still not capable of fully performing at the level of efficiency of an adult animal. The final stage in the development to the adult ruminant occurs when the rumen is considered to be fully functioning, which generally happens at an age of 12 weeks (see e.g. Teagasc 2017: Rumen development, Section 4; Chapter 12, page 60 (https://www.teagasc.ie/media/website/publications/2017/Section4-Rumen-development.pdf) or Rearing Young Stock on Tropical Dairy Farms in Asia (John, Moran), chapter 3: *Digestion of feeds in the milk fed calf*: page 27).

Within the meaning of the present invention, the term 'pre-ruminant' refers to the animal which is still (at least partly) not yet weaned, while the term 'young ruminant' refers to the phase where the rumen is still not fully developed but the calf has been weaned (i.e. does not receive any milk anymore).

In the present context, a ruminant is a mammal of the order Artiodactyla that digests plant-based feed by initially softening it within the animal's first stomach, known as the rumen, then regurgitating the semi-digested mass, now known as cud, and chewing it again. The process of again chewing the cud to further break down plant matter and stimulate digestion is called "rumination". Ruminating mammals include cattle, bovines, goats, sheep, giraffes, deer, gazelles, and antelopes. Preferred ruminants for all embodiments of the present invention are domestic cattle, sheep and goats. Most preferred ruminants in all embodiments according to the present invention are domestic cattle and accordingly the calves thereof. The term 'cattle' includes all races of domestic cattle, and all production types of cattle (such as e.g. dairy cows, grazing cattle and beef cattle). Particularly preferred are grazing cattle, as they are difficult to reach with supplementation later in life (i.e. in their adult life).

In the present context 'methanogens' are microorganisms that produce methane as a metabolic byproduct. They are prokaryotic and belong to the domain of archaea. Often, they are also referred to as methanogenic archaea. Together with various bacteria, protozoa and fungi, they are present in the rumen.

Anti-methanogenic compounds' are compounds that can be used to inhibit the activity of such methanogenic archaea to reduce methane emissions e.g. emanating from the digestive activities of ruminants.

3-Nitrooxypropanol (CAS-No: 100502-66-7) is a known compound which can e.g. be manufactured as outlined in WO-2004043898 or WO-2012084629. Suitable formulations thereof are e.g. disclosed in WO-2018149755, WO-2018149756, WO-2018091643 or WO-2019007740.

The term 'feed' as used herein refers to any compound, preparation, mixture, or composition suitable for, or intended for intake by the respective animal and is not restricted to only nutritional materials.

The term 'edible oil(s) or solvent(s)' as used herein refers to oils or solvents commonly used in feed applications. Preferred edible oils or solvents in all embodiments of the present invention are propylene glycol, corn oil, rapeseed oil, sunflower oil, middle chain triglyceride (MCT) and glycerol as well as mixtures thereof.

The methane emissions respectively methane reductions as referred to herein can be measured in individual animals in metabolic chambers by methods known in the art (Grainger et al., 2007 J. Dairy Science; 90: 2755-2766). Moreover, it can also be assessed at barn level by an emerging technology using laser beam (McGinn et al., 2009, Journal of Environ-mental Quality; 38: 1796-1802). Alternatively, methane produced by a ruminant can also be assessed with the GreenFeed system (C-Lock, Rapid City, SD USA), which method is preferred.

The term 'microbial colonialization pattern' refers to a specific rumen microbial composition (also called rumen microflora) which develops during the first hours, days and weeks of a ruminant and then persist over the whole lifespan of the animal. Said rumen microflora mainly consists of bacteria, archaea (such as in particular methanogenic archaea), protozoa and fungi.

The term 'from birth' as used herein refers to the time span up to at most 3 days after birth, preferably up to at most 2 days after birth, most preferably up to at most 1 day after birth. Most preferably, the supplementation of 3-nitrooxypropanol is started with the first supplementation of feed, other than by suckling.

Dosage and Administration

3-Nitrooxypropanol is administered at least during the pre-ruminant phase. More preferably, however, the administration of 3-nitrooxypropanol is at least partly extended into the post-weaning (i.e. young ruminant) phase, such as for another 1, 2, 3, 4, 5, 6, 7 or 8 weeks.

Thus, advantageously, 3-nitrooxypropanol is administered to the ruminant from birth until up to 8 weeks post-weaning.

Alternatively, in all embodiments of the present invention, 3-nitrooxypropanol is preferably administered to the ruminant from birth up to an age of a maximum of 6 months, preferably up to an age of a maximum of 5 months, most preferably up to an age of a maximum of 4 months, such as up to an age of a maximum of 3 months.

In all embodiments according to the present invention it is preferred that the supplementation with 3-nitrooxypropanol is completely stopped after said defined period of administration (i.e. not extended into the adult life).

The 3-nitrooxypropanol may be administered on a daily basis or every second day or on a weekly basis. Preferably, in all embodiments according to the present, invention 3-nitrooxypropanol is administered daily such as at least once a day.

It is furthermore preferred that the 3-nitrooxypropanol is administered orally to the pre-ruminant/young ruminant.

The amount of the 3-nitrooxypropanol to be administered to the pre-ruminant/young ruminant is preferably selected in the range from 10 mg to 10 g 3-NOP per animal per day, preferably from 50 mg to 5 g 3-NOP per animal per day, more preferably, from 75 mg to 2.5 g 3-NOP per animal per day. Further suitable ranges include from 100 mg to 2 g of 3-NOP per animal per day or 100 to 500 mg of 3-NOP per animal per day.

In another and more preferred embodiment, the amount of the 3-nitrooxypropanol to be administered to the pre-ruminant/young ruminant is selected in the range from 0.1 mg to 15 mg 3-NOP/kg bodyweight (BW), more preferably in the range from 0.5 to 10 mg 3-NOP/kg BW, most preferably in the range from 1 to 5 mg 3-NOP/kg BW, such as in the range of 2 mg to 4 mg 3-NOP/kg BW.

A person skilled in the art can appreciate that the total (daily) amount of the 3-nitrooxypropanol fed can vary depending upon the animal species, size of the animal and type of the feedstuff to which 3-nitrooxypropanol or a formulation or composition thereof is added.

The total (daily) amount of 3-nitrooxypropanol may be administered in one single dose or distributed over several doses e.g. one dose in the morning and one dose in the evening.

In all embodiments of the present invention, 3-nitrooxypropanol may be used as such. Preferably, however, 3-nitrooxypropanol is used in the form of a formulation thereof, i.e. in the form of a composition comprising 3-nitrooxypropanol and a suitable carrier material (also referred to herein as '3-NOP formulation'). The 3-nitrooxypropanol or a formulation thereof may be administered to the pre-ruminant/young ruminant as such or may be admixed into the pre-ruminant/young ruminant feed.

Suitable carriers for 3-NOP formulations include any carrier well known in the food and feed industry such as water, edible oil(s) or solvent(s) such as preferably propylene glycol, silica (silicon dioxide), diatomaceous earth as well as sepiolite without being limited thereto. Most preferred carrier materials according to the present invention are silica, propylene glycol or water as well as mixtures thereof.

The 3-NOP formulations may be formulated in any form suitable for direct administration to the pre-ruminant/young ruminant or for admixture into pre-ruminant/young ruminant feed. Suitable solid forms for direct administration or admixture are e.g. a powder, a granule or a pellet. Suitable liquid forms for direct administration or admixture are e.g. a solution or a suspension. The 3-NOP formulations may also be in the form of a controlled (delayed) release formulation.

The amount of 3-nitrooxypropanol in 3-NOP formulations according to the present invention is preferably selected in the range of 0.1 to 20 wt.-%, more preferably in the range of 0.5 to 15 wt.-%, most preferably in the range of 1 to 12 wt.-%, based on the total weight of the formulation.

The 3-NOP formulations according to the present invention are preferably administered admixed into or with the pre-ruminant's or young ruminant's feed.

Solid 3-NOP Formulations

In one advantageous embodiment, the 3-NOP formulation is a solid formulation such as preferably a dry, free-flowing powder comprising 3-NOP and a solid carrier material (also referred to herein as powdered 3-NOP formulation) or a pellet comprising 3-nitrooxypropanol. Such solid formulations are suitable either for direct feeding to the pre-ruminant/young ruminant or for the inclusion into a commercially-available pre-ruminant/young ruminant feed or as a supplement to a total mixed ration or diet. When supplemented with the pre-ruminant/young ruminant feed, the solid formulation is generally admixed with either the solid or the liquid feed or with (drinking) water.

Powdered formulations comprising 3-nitrooxypropanol and a solid carrier material are usually prepared by admixing 3-NOP with a solid carrier material by standard methods in the art. Alternatively 3-NOP can be sprayed onto solid carrier material. For example, 3-NOP can be sprayed onto a solid carrier material using a solvent suitable for the preparation of food or feed products such as e.g. dichloromethane followed by evaporation of the organic solvent.

Particularly suitable solid carriers for the preparation of powdered 3-NOP formulations include silica (silicon dioxide), diatomaceous earth as well as sepiolite without being limited thereto. The most preferred solid carrier material according to the present invention is silica.

Such silica is a well-known carrier material in the feed and food industry and refers to white microspheres of amorphous silica (also referred to as silicon dioxide). Particular suitable silica according to the present invention is amorphous precipitated silica e.g. available as Ibersil D-250 at IQE Group, Sipernat 2200 at Evonik or Tixosil 68 at Solvay.

It is well understood, that 3-NOP can be diluted in a suitable edible oil or solvent (liquid carrier) before being sprayed onto or admixed with the solid carrier material.

Furthermore, the powdered 3-NOP formulation according to the present invention may in addition contain usual additives used in the preparation of powdered formulations for feed application, such as in particular thickeners, which are advantageously selected from gums or cellulose derivatives such as xanthan gum, karaya gum and/or ethylcellulose as well as (traces) of water.

The amount of 3-nitrooxypropanol in the powdered 3-NOP formulation according to the present invention is preferably selected in the range of 1 to 20 wt.-%, preferably in the range of 2 to 15 wt.-%, most preferably in the range of 4 to 12 wt.-%, based on the total weight of the formulation.

Preferably at least one edible oil or solvent is present in the powdered 3-NOP formulations according to the present invention. The amount of the edible oil(s) and/or solvent(s) in such powdered 3-NOP formulations is preferably selected in the range of 0.1 to 50 wt.-%, preferably in the range of 1 to 45 wt.-%, most preferably in the range of 10 to 40 wt.-%, based on the total weight of the formulation.

A particular suitable powdered 3-NOP formulation according to the present invention consists essentially of 3-nitrooxypropanol, propylene glycol and silica (silicon dioxide) such as of (i) 2 to 12 wt.-% of 3-nitrooxypropanol, (ii) 20 to 40 wt.-% of propylene glycol, (iii) 0 to 7 wt.-% of water and (iv) silica, wherein the total amount of ingredients (i) to (iv) sum up to 100 wt.-%. Such formulations are e.g. disclosed in WO-2018149756 or WO-2018149755.

Alternatively, 3-nitrooxypropanol may be supplemented in the form of a compressed tablet such as disclosed in WO-2019007740.

Liquid 3-NOP Formulations

In another embodiment, the 3-NOP formulation can be a liquid formulation suitable for direct administration to the pre-ruminant/young ruminant or suitable for inclusion into a commercially-available pre-ruminant/young ruminant feed or as a supplement to a total mixed ration or diet.

Suitable liquid 3-NOP formulations encompass e.g. solutions of 3-NOP in water or in an edible oil or solvent (or mixtures thereof) such as preferably in propylene glycol.

It is well understood, that the liquid 3-NOP formulation according to the present invention may also contain usual additives used in the preparation of liquid formulations for feed application or drinking water additives for ruminants such as e.g. vitamins, sugars, salts and flavoring agents.

The amount of 3-nitrooxypropanol in the liquid 3-NOP formulation is preferably selected in the range of 1 to 30 wt.-%, preferably in the range of 5 to 28 wt.-%, most preferably in the range of 10 to 25 wt.-%, based on the total weight of the formulation.

A particular suitable liquid 3-NOP formulation consists essentially of a 10 to 30 wt.-% solution of 3-nitrooxypropanol in water and/or propylene glycol.

Pre-Ruminant/Young Ruminant Feed

For the realization of its use according to the present invention 3-nitrooxypropanol or a formulation thereof such as preferably a powdered or a liquid formulation thereof may be incorporated in the pre-ruminant/young ruminant feed by methods known per se in the art of feed formulation and processing.

Further aspects of the present invention therefore relate to pre-ruminant and/or young ruminant feed containing 3-nitrooxypropanol or a formulation thereof.

Suitable feed for pre-ruminants is milk or milk replacement preparations (milk replacers). Such milk and milk replacement preparations comprising 3-nitrooxypropanol or a formulation thereof are still novel.

Thus, the present invention also relates to milk or milk replacers for pre-ruminants, characterized in that said milk or milk replacers comprise 3-nitrooxypropanol or a formulation thereof.

The term milk or milk replacers refers to whole milk, fat reduced milk and no fat milk, unsalable milk, and reconstituted milk replacer. "Unsalable milk" is defined as milk which cannot, by law, be sold for human consumption. Milk replacers are formulated feeds designed to replace the dam's milk for calves during critical, early suckling or milk feeding stages of life.

Milk replacers generally contain 18 to 30 wt.-% protein and 10-28 wt.-% fat, with 18 wt.-% to 22 wt.-% being the most preferred fat level, and optionally further additives and/or medicaments. Milk replacers are reconstituted with water, mixed and fed according to the directions of the manufacturer.

Exemplary protein sources to be used in the milk replacer are milk proteins such as dried whey protein concentrate, dried whey, dried whey product, skim milk, dried skim milk powder, casein as well as sodium or calcium caseinate. Alternative protein sources encompass soy protein isolate, protein modified soy flour, soy protein concentrate, soy flour, animal plasma as well as wheat gluten or isolate, legume proteins and legume protein isolates. Suitable fats encompass vegetable and animal fat and fractions thereof. Exemplary additives are in particular carbohydrates, mainly from lactose, amino acids, (essential) vitamins and trace minerals and other materials considered acceptable for use in animal feed by local authorities.

The amount of 3-nitrooxypropanol in the milk or the reconstituted milk replacer is preferably selected in the range from about 1 mg to about 1000 mg, preferably from about 1 mg to about 500 mg, most preferably from about 1 mg to 250 mg 3-NOP per liter of milk or reconstituted milk replacer.

For calves, the amount of 3-nitrooxypropanol in the milk or the reconstituted milk replacer is most preferably selected in the range 10 to 100 mg/L.

For small ruminants such as lambs and goat kids, the amount of 3-nitrooxypropanol in the milk or the reconstituted milk replacer is most preferably selected in the range 1 mg to 100 mg/L.

Post-weaning, the 3-nitrooxypropanol or a composition or formulation comprising 3-nitrooxypropanol according to the present invention is preferably admixed into the respective young ruminant feed, such as preferably young ruminant concentrate feed. Such concentrate feed should preferably be coarse-textured, high in energy and protein and low in roughage (>15%). Cereal grains (oats, barley, wheat, corn, triticale) may also be used, mixed with molasses, dehydrated alfalfa or grass pellets, bran or other co-products derived from the food, beverage and feed industries.

The young ruminant feed according to the present invention may further contain conventional young ruminant feed additives and adjuvants, excipients or diluents, including, but not limited to, water, molasses, calcium carbonates, electrolytes such as ammonium chloride, proteins such as soya bean meal, canola meal, lentils, lupins, peas, beans wheat, starch, sunflower meal, corn, amino acids, fats, vitamins and trace minerals and other materials considered acceptable for use in animal feed by local authorities.

Typically, young ruminant feed would be formulated from, but not limited to, a selection of the following ingredients: barley, wheat, triticale, oats, peas, lupins, lentils, beans, soybean, canola, sunflower and products derived from these ingredients. Vegetable oil, molasses, limestone, di-calcium phosphate, salt, bentonite, magnesium oxide, acidifier, lysine, methionine, antioxidants and coccidiostats and other medicines may also be included. Certain co-products such as palm kernel extract (PKE), hominy chop and distillers grains may also be included.

The amount of 3-nitrooxypropanol in the young ruminant feed is preferably selected in the range from about 1 mg to about 1000 mg, preferably from about 1 mg to about 500 mg, most preferably from about 1 mg to 250 mg 3-NOP per liter of milk or reconstituted milk replacer.

It is well understood that the amount of 3-NOP administered can further be adjusted to the specific needs of the respective pre-ruminant/young ruminant to be treated such as the calves, lambs or goat kids.

In a particular advantageous embodiment according to the present invention, the 3-nitrooxypropanol is supplemented in the form of a liquid preparation such as admixed into milk or a liquid milk replacer preparation (i.e. a reconstituted milk replacer).

Thus, the present invention also relates to a method of supplying a pre-ruminant liquid feed, most preferably milk or a liquid milk replacement preparation comprising 3-nitrooxypropanol or a formulation thereof to a pre-ruminant calf, said method comprising dissolving 3-nitrooxypropanol or a formulation thereof in the liquid feed and feeding the liquid feed containing 3-nitrooxypropanol or a formulation thereof to the pre-ruminant calf.

In a further embodiment, the present invention also provides the use of a pre-ruminant and/or young ruminant feed comprising 3-nitrooxypropanol or a formulation thereof for a (non-therapeutic) long-term, persistent reduction of the formation of methane emanating from the digestive activities of ruminants in its adult life and/or for reducing the total life-time methane emission of a ruminant, preferably wherein it is not needed or desired to additionally administer 3-nitrooxypropanol to the adult ruminant.

The invention further provides a method for the long-term, persistent reduction of the production of methane emanating from the digestive activities of adult ruminants, said method comprising orally administering a sufficient amount of a pre-ruminant and/or young ruminant feed comprising 3-nitrooxyropanol or a composition or formulation thereof to a pre-ruminant and/or young ruminant.

The invention solves a so far unsolved issue: With the help of the current invention the gastro-intestinal tract of a pre-ruminant/young ruminant is adapted in a way that the total life-time methane emission of said ruminant is lower compared to a respective non-treated ruminant. This especially means that the methane reduction (compared to a respective non-treated ruminant) lasts into and during the adult life of a ruminant even after the supplementation with 3-nitrooxypropanol or a composition or formulation thereof is stopped.

Thus, 3-nitrooxypropanol is useful as an active ingredient for feed additives and animal feed compositions for pre-ruminants and young ruminants and accordingly is useful as an active ingredient to adapt the gastro-intestinal tract of a pre-ruminant/young ruminant for long-term, persistent reduced methane emissions (compared to non-treated animals), in particular by all methods and uses as disclosed herein.

The long-term persistent methane reduction in all embodiments of the present invention is preferably characterized by at least 5% less, more preferably at least 10% less, most preferably at least 15% less methane ((calculated in g $CH_4$/day) after 1 year of birth, when compared to a non-treated control group (measured using the GreenFeed system (C-Lock, Rapid City, SD USA)). It is well understood that the control group is of the same breed raised under the same management conditions (same farm, same herd, similar genetics and source of inoculations and similar age).

FIGURE

FIG. 1: x-axis: age of animal in weeks; y-axis: Methane emission in g $CH_4$/d; Period I: 3-NOP supplementation; Period II: No 3-NOP supplementation; dotted line: treatment group; solid line: control group. For more details see Examples.

EXAMPLES

Experimental Set-Up

At birth 18 female Holstein (n=12), Montbéliarde (n=4) and Holstein×Montbéliarde (n=2) calves were randomly assigned to either a treatment group (3 mg 3-NOP (active)/kg BW) or control group (placebo supplement i.e. without 3-NOP but with silica and propylene glycol). 3-NOP was supplemented in the form of a 3-NOP powdered formulation (10 wt.-% of 3-NOP admixed with silica and propylene glycol) such that breed distribution and birthweight were balanced across groups. Treatment was administered daily from birth until three weeks post-weaning (week 14) (admixed in a small volume of water and delivered by an oral gavage). Calves were weighed weekly. Milk and concentrate intake prior to weaning was recorded using automated feeders. Animals were group housed in a single pen following weaning. Samples of rumen liquid were collected at week 1, 4, 11, 14, 23 and 60 weeks of life and DNA from these samples of rumen liquid content were extracted and subjected to Illumina MiSeq sequencing. Methane emissions from the calves were measured using the GreenFeed system (C-Lock, Rapid City, SD USA) from weaning at week 11 to week 23 and later from week 56 to 60 of life.

Results

Treated calves showed a persistent reduction (overall 11.6%, P=0.03) in methane emissions (g $CH_4$/d) throughout the post-weaning period, despite treatment ceasing three weeks post-weaning (Table 1). When methane emissions were measured nearly one year later (weeks 56 to 60 of life) overall methane emissions in the treatment group were still significantly reduced by about 19% (P<0.05) indicating persistency of the effect (see FIG. 1).

Calf physiological parameters (bodyweight (BW) and average daily gain (ADG)) were similar across groups throughout the trial indicating no adverse effect on performance by the early life treatment (see Table 2 and 3). Furthermore, no significant changes in the relative abundance of methanogens as a result of 3-NOP treatment was observed.

TABLE 1

Effect of 3-nitrooxypropanol supplementation on methane emissions (g/day) from calves measured after weaning at 11 weeks to 23 weeks of age and in later life 56 to 60 weeks of age.

| | Age of animal [in weeks] | | | | | |
|---|---|---|---|---|---|---|
| | 11 | 14 | 17 | 20 | 23 | 56 to 60 |
| | daily supplementation | | no supplementation | | | |
| Control (n = 8) | 48.4 | 72.4 | 81.4 | 101.9 | 111.2 | 238.7 |
| Treatment (n = 10) | 45.0 | 63.4 | 68.2 | 88.9 | 97.13 | 193.0 |
| Δ $CH_4$ emissions [g $CH_4$/d] | −3.4 | −9.00 | −13.2 | −13 | −14 | −45.7 |
| Δ $CH_4$ emissions [%] | −7.0 | −12.4 | −16.2 | −12.7 | −12.7 | −19.2 |

TABLE 2

Bodyweight (BW) of calves (in kg)

| | Age of animal [in weeks] | | | | | | |
|---|---|---|---|---|---|---|---|
| | 0 | 11 | 14 | 17 | 20 | 23 | 56 to 60 |
| Control (n = 8) | 40.8 | 104.7 | 123.1 | 140.2 | 158.1 | 184.2 | 357 |
| Treatment (n = 10) | 41.6 | 102.2 | 119.5 | 134.9 | 151.8 | 189.5 | 339 |

No significant difference in the bodyweight was observed.

TABLE 3

Average Daily Gain (ADG) (kg/d) from week 0 to 23 weeks of life

| | ADG (kg/d) |
|---|---|
| Control (n = 8) | 0.84 |
| Treatment (n = 10) | 0.79 |

No significant difference in average daily gain was observed.

The invention claimed is:

1. A method for reducing methane emission in adult ruminants, said method comprising administering to said ruminants an effective amount of a composition comprising 3-nitrooxypropanol (3-NOP) from birth up to an age of a maximum of 6 months.

2. The method according to claim 1, wherein the 3-nitrooxypropanol is administered orally.

3. The method according to claim 1, wherein the 3-nitrooxypropanol is administered at least once a day.

4. The method according to claim 1, wherein the amount of 3-nitrooxypropanol (3-NOP) administered to the ruminant is in the range from 0.1 mg to 15 mg 3-NOP/kg bodyweight (BW).

5. The method according to claim 1, wherein the 3-nitrooxypropanol is administered admixed into the pre-ruminant/young ruminant feed.

6. The method according to claim 1, wherein the pre-ruminant feed is milk or a milk replacement preparation.

7. The method according to claim 1, wherein the methane emission is reduced by at least 5% after 1 year from birth, as compared to a non-treated control group.

8. The method according to claim 1, wherein the ruminant is selected from the group consisting of domestic cattle, sheep and goats.

* * * * *